(12) United States Patent
Falahati et al.

(10) Patent No.: US 9,473,217 B2
(45) Date of Patent: Oct. 18, 2016

(54) MACRO DIVERSITY USING LIKELIHOOD VALUES

(75) Inventors: Sorour Falahati, Stockholm (SE); Robert Baldemair, Solna (SE); Ali Behravan, Stockholm (SE); Anders Furuskär, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 104 days.

(21) Appl. No.: 13/578,343

(22) PCT Filed: Feb. 15, 2010

(86) PCT No.: PCT/SE2010/050171
§ 371 (c)(1),
(2), (4) Date: Aug. 10, 2012

(87) PCT Pub. No.: WO2011/099907
PCT Pub. Date: Aug. 18, 2011

(65) Prior Publication Data
US 2012/0314742 A1    Dec. 13, 2012

(51) Int. Cl.
*H03D 1/00* (2006.01)
*H04L 12/413* (2006.01)
(Continued)

(52) U.S. Cl.
CPC ............ *H04B 7/022* (2013.01); *H04B 7/0615* (2013.01); *H04B 7/0639* (2013.01); *H04B 7/0848* (2013.01); *H04W 36/04* (2013.01)

(58) Field of Classification Search
CPC  H04B 7/0615; H04B 7/0608; H04B 7/0417; H04B 1/1081; H04B 7/0862; H04B 7/0689
USPC .......................................... 375/343; 370/447
See application file for complete search history.

(56) References Cited

U.S. PATENT DOCUMENTS

| 4,466,096 A | * | 8/1984 | Heins | H04L 12/413 |
| | | | | 370/447 |
| 5,276,905 A | * | 1/1994 | Hurst | H04W 48/16 |
| | | | | 455/435.2 |

(Continued)

OTHER PUBLICATIONS

Valenti et al, "Multiuser Detection with Base Station Diversity" IEEE published 1998.*

(Continued)

*Primary Examiner* — Daniel Washburn
*Assistant Examiner* — Sarah Hassan
(74) *Attorney, Agent, or Firm* — Murphy, Bilak & Homiller, PLLC

(57) ABSTRACT

Method and arrangement in a serving base station for determining a binary value of information data received from a user equipment, by using a supportive likelihood value received from a supporting base station. The user equipment transmits information data to be received both by the serving base station and the supporting base station base station. The method comprises: decoding information data bits received from the user equipment into a first likelihood value, without determining a binary value for each bit of the information data, a supportive likelihood value of the information data bits transmitted from the user equipment is received from the supporting base station, which supportive likelihood value is based on a decoding of the information data bits performed in the supporting base station. The first likelihood value of the decoded information bits is combined with the received supportive likelihood value of the decoded information bits. Thus a binary value for each bit of the information data transmitted from the user equipment is determined, based on the combined first and supportive likelihood values.

19 Claims, 9 Drawing Sheets

(51) Int. Cl.
*H04B 7/02* (2006.01)
*H04B 7/06* (2006.01)
*H04W 36/04* (2009.01)
*H04B 7/08* (2006.01)

(56) References Cited

U.S. PATENT DOCUMENTS

| | | | | |
|---|---|---|---|---|
| 5,491,834 | A | * | 2/1996 | Chia ................. H04W 36/04 455/441 |
| 5,640,442 | A | * | 6/1997 | Fitzgerald ........ H04W 72/085 340/7.21 |
| 7,006,800 | B1 | * | 2/2006 | Lashkarian ......... H04B 17/26 375/343 |
| 8,204,442 | B2 | * | 6/2012 | Sankar et al. ............... 455/63.1 |
| 2001/0022558 | A1 | * | 9/2001 | Karr, Jr. .................. G01S 1/026 342/450 |
| 2002/0082038 | A1 | * | 6/2002 | Mochizuki ........... H04W 52/40 455/522 |
| 2004/0121773 | A1 | * | 6/2004 | O'Brien ............ H04W 36/0083 455/438 |
| 2005/0227693 | A1 | * | 10/2005 | Kong et al. .................... 455/436 |
| 2007/0242764 | A1 | * | 10/2007 | Anigstein et al. ............. 375/260 |
| 2007/0287473 | A1 | * | 12/2007 | Dupray .................. H04W 4/02 455/456.1 |
| 2008/0220788 | A1 | * | 9/2008 | Stanwood ............. H04L 5/0007 455/450 |
| 2009/0279442 | A1 | * | 11/2009 | Rave ............................. 370/246 |
| 2011/0103339 | A1 | * | 5/2011 | Kim et al. .................... 370/329 |

OTHER PUBLICATIONS

Valenti, Matthew et al., "Multiuser Detection with Base Station Diversity," Universal Personal Communications, 1998. ICUPC 1998. IEEE 1998, Oct. 9, 1998.

Falconetti, Laetitia et al., "Distributed Uplink Macro Diversity for Cooperating Base Stations," Communications Workshops 2009, IEEE 2009. Jun. 18, 2009.

* cited by examiner

MACRO DIVERSITY USING LIKELIHOOD VALUES

TECHNICAL FIELD

The present invention relates to a method and arrangement in a serving base station and to a method and arrangement in a supporting base station. In particular, it relates to a mechanism for exchanging information between the serving base station and the supporting base station for determining a binary value of information data received from a user equipment.

BACKGROUND

This disclosure concerns the required backhaul capacity by the cooperative base stations for enhancement of uplink transmission.

In the present context, the backhaul portion of the network comprises the intermediate links between the core, or backbone, of the network and peripheral sub networks at the edge of the entire hierarchical network. For example, while cell phones communicating with a single cell tower constitute a local sub network, the connection between the cell tower and the rest of the world begins with a backhaul link to the core of the telephone company's network via a point of presence. Further, the expression uplink is here used to denote the transmission from a user equipment to a base station while a signal transmission in the opposite direction i.e. from the base station to the user equipment is referred to as a downlink transmission.

In design of cellular systems, or wireless communication systems as they also may be referred to, one of the challenging problems is to improve the performance of cell edge user equipment units. In cellular systems with frequency reuse, it is likely that user equipment units in the neighbouring cells transmit on the same resources as some of the user equipment units within the cell of interest. The simultaneous transmission by these user equipment units on the same resources creates interference which has a larger impact on cell-edge user equipments, since they originally suffer from larger attenuation on their transmitting signals to the base station. Hence, solutions to improve the performance of such user equipment units are of great interest.

Among various approaches to tackle this problem, some solutions promote cooperation between base stations by exchanging information between them to enhance the link quality which in particular would be beneficial for the cell edge user equipment units. The cooperation can be centralized or distributed. In the centralized approach a single super base station and remote antennas which are located in different cells are involved. The interference between cells with the same super base station can be mitigated, while the interference between cells belonging to a different super base station still remains.

An example of the distributed solution for cooperative base stations is based on the concept of letting the base station that is serving a certain user equipment receive complement information concerning the user equipment signals from one or more supporting base stations. Thus the serving base station could increase the likelihood of decode the user equipment signals correctly, thereby achieving less retransmissions. It may here be mentioned that the any base station of the cooperative base stations may sometimes have the role of serving base station and sometimes of supporting base station, depending e.g. of the position of the user equipment and/or load distribution.

The distributed solution tackles the drawback of the central solution while providing similar gain as the centralized solution at the expense of demanding higher capacity on the base station to base station interfaces whose traffic is carried on the backhaul network. Therefore methods to reduce the requirement on the backhaul capacity are of interest.

Further, wireless communication systems may employ error correction in order to correct errors caused by e.g. disturbance generated during transmission. A wireless communication system may use e.g. a turbo code for the error correction. At the transmitter side, the turbo encoder introduces redundancy bits based on the information data bits that are to be transmitted. The encoded data bits at the output of turbo encoder are then modulated and transmitted to the receiver, i.e. base station in uplink transmission. At the receiver end, the receiver demodulates the received signal and produce received soft bits to the turbo decoder. Turbo decoder decodes the received soft encoded bits to recover the information data bits. The concept of soft bits and hard bits are further explained later in the description.

To maximize the advantage of the coding gain obtained by the iterative decoding process in the turbo decoder, rather than determining immediately whether received encoded bits are zero or one, the communication receiver may assign each bit of value on a multi level scale representative of the probability that the bit is 1. This likelihood value is in the present context referred to as a soft bit, while the decoded data bit with a determined value, one or zero, is referred to as a hard bit. Thus the term hard bits is in this context meaning that the decoder decides a transmitted data bit is "0" if its corresponding measure indicates it is more likely that "0" is transmitted than "1" and vice versa. These bits are referred to as decoded hard data bits. Thus, to mention an example for binary signalling, received pulses are sampled and the resulting voltages are compared with a threshold value. If a voltage is greater than the threshold value it is considered to be definitely one, regardless of how close it is to the threshold value. If it is less than the threshold value, it is decoded definitely as zero.

A distributed control, based on the request-response mechanism has been proposed. A serving base station associated to the user equipment requests information from the supporting base station. In response, the information is transmitted to the serving base station via the backhaul network. Depending on the type of information, the required capacity on the backhaul network as well as the link quality for the user equipment in hand varies. The information obtained from the physical layer is in one of the following forms I/Q samples, Demodulated soft bits or Decoded hard data bits.

I/Q Samples

The In-phase and Quadrature-phase (I/Q) samples at the supporting base station associated to the user equipment of interest are transmitted to the serving base station in response to the request initiated from the serving base station. This exchange results in virtually increasing the number of receive antennas at the serving base station. The received signals from the serving base station and the supporting base stations can be processed jointly by means of advanced receiver algorithms for mitigating the interference and other impairments and provide improved link quality as compared to the non-cooperative case.

Demodulated Soft Bits

In this mode, in response to the request from the serving base station, the supporting base station processes the received signal with its corresponding receiver algorithms.

The receivers can deploy methods for mitigating the interference as well as channel estimation. The processed received signals at different receive antennas are combined based on the utilized combining algorithms and are equalized. Eventually the combined signal is demodulated. The outcome is soft bits corresponding to transmitted coded bits which can be used as input values by the decoder. However, the supporting base station does not perform any decoding and instead transmits the demodulated soft bits to the serving base station before decoding. The serving base station which has performed similar operations on its own received signal combines the received demodulated soft bits from the supporting base station with its own, using for example chase combining method and then performs decoding.

Decoded Hard Data Bits

In this mode, in response to the request from the serving base station, the supporting base station processes the receive signal at its antennas even further than the previous case in the sense that the demodulated soft bits are decoded by the channel decoder and are also checked by the Cyclic Redundancy Check (CRC) decoder for error detection purposes. If the decoded hard data bits pass the CRC check, they are transmitted to the serving base in response to its request. The serving base station which has performed the similar procedure on its own received signals performs selection combining. In other words, the serving base station uses the decoded hard data bits received from the supporting base station only if its own decoded hard data bits are failed at the CRC check.

The last two mentioned modes can be also combined such that in response to the request from the serving base station, the supporting base station transmits the demodulated soft bits if the decoded hard bits are failed at the CRC check. Otherwise it sends the decoded hard data bits. In this case the advantages of the two modes are captured.

It may be mentioned that both I/Q samples and the demodulated soft bits are quantized and represented by bits before being exchanged. Apparently quantization is not required for the decoded hard data bits.

As it is clear, the amount of information in the I/Q samples is more complete as compared to the demodulated soft bits and the decoded hard data bits. The cooperation between base stations based on exchanging the I/Q samples virtually increases the number of receive antennas at the serving base station. This enables the serving base station to apply more advanced receiver algorithms to mitigate the interference and consequently improve the link quality.

When the demodulated soft bits are exchanged, the channel estimation, interference mitigation and equalization take place at each base station individually. The serving base station combines the received demodulated soft bits from the supporting base station with its own and performs decoding where some improvement is obtained due to the soft combining. The cooperation based on exchanging the demodulated soft bits in turn outperforms the cooperation based on the exchange of decoded hard data bits where the serving base station selects the decoded hard data bits sent by the supporting base station if its own have failed the CRC check.

However, the performance gain is at the expense of a higher demand on the backhaul capacity. The exchange of I/Q samples requires larger backhaul capacity as compare to exchanging the demodulated soft bits. The least capacity is required when decoded hard data bits are exchanged.

Although the best link quality performance can be achieved by exchanging the I/Q samples, the load on the backhaul capacity is considerably larger than the other options. Moreover, as the number of uplink user equipment units and/or the receive antennas and/or the supporting base stations grows the load on the backhaul capacity linearly increases. The severe impact on the backhaul network for the I/Q samples exchange makes the realization of this cooperation very inefficient in most practical cases. Therefore, from a practical point of view, the other two options that demonstrate lower backhaul capacity become more attractive, but at the cost of lower link quality. However, by increasing the number of user equipment units and/or supporting base stations the required capacity of these methods linearly increases as well.

Exchanging the demodulated soft bits especially when high order modulation schemes are used requires considerable backhaul capacity. Exchanging the decoded hard data bits provides the lowest load on the backhaul network but suffers from poor performance.

SUMMARY

It is therefore an object of the present invention to provide a mechanism for improving the performance in a wireless communication system.

According to a first aspect of the present invention, the object is achieved by a method in a serving base station. The method aims at determining a binary value of information data received from a user equipment by using a supportive likelihood value received from a supporting base station. The user equipment transmits information data to be received both by the serving base station and the supporting base station. The method comprises receiving and decoding information data bits received from the user equipment into a first likelihood value, without determining a binary value for each bit of the information data. Further the method comprises receiving a supportive likelihood value of the information data bits transmitted from the user equipment, from the supporting base station. The supportive likelihood value is based on a decoding of the information data bits performed in the supporting base station. The method also comprises combining the first likelihood value of the decoded information bits with the received supportive likelihood value of the decoded information bits. Also, the method comprises determining a binary value for each bit of the information data transmitted from the user equipment, based on the combined first and supportive likelihood values.

According to a second aspect of the present invention, the object is achieved by an arrangement in a serving base station for determining a binary value of information data received from a user equipment by using a supportive likelihood value received from a supporting base station. The user equipment transmits information data to be received both by the serving base station and the supporting base station. The arrangement comprises a receiver. The receiver is configured to receive information data from the user equipment. The arrangement also comprises a decoder. The decoder is configured to decode information data received from the user equipment into a first likelihood value, without determining a binary value for each bit of the information data. Further, the arrangement comprises an intra base station connection interface. The arrangement also comprises an intra base station connection interface is configured to receive a supportive likelihood value of the information data transmitted from the user equipment from the supporting base station. In addition the arrangement also comprises a combining unit. The combining unit is configured to combine the first likelihood value with the received supportive likelihood value. In further addition, the arrangement comprises a determination unit. The determination unit is configured to determine a binary value for each bit of the information data transmitted from the user equipment, based on the combined first and supportive likelihood values.

According to a third aspect of the present invention, the object is achieved by a method in a supporting base station. The method aims at assisting a serving base station in determining a binary value of information data received from a user equipment. The user equipment transmits information data to be received both by the serving base station and the supporting base station. The method comprises receiving decoding information data received from the user equipment into a likelihood value, without establishing a binary value for each bit of the information data. Further, the method comprises transmitting the decoded likelihood value of the information data transmitted from the user equipment, to the serving base station, thereby enabling the serving base station to determining a binary value of the information data received from the user equipment.

According to a fourth aspect of the present invention, the object is achieved by an arrangement in a supporting base station for assisting a serving base station in determining a binary value of information data received from a user equipment. The user equipment transmits information data to be received both by the serving base station and the supporting base station. The arrangement comprises a receiver. The receiver is configured to receive information data from the user equipment. The arrangement also comprises a decoder. The decoder is configured to decode information data received from the user equipment into a likelihood value, without establishing a binary value for each bit of the data. Also, the arrangement comprises an intra base station connection interface. The intra base station connection interface is configured to transmit the decoded likelihood value of the information data transmitted from the user equipment to the serving base station.

Embodiments of the present method of exchanging the soft data bits when the base stations cooperate to improve the uplink link quality based on a request and response mechanism in a distributed manner have the following advantages as compare to other solutions:

Embodiments of the proposed method provide low required backhaul capacity, especially for intermediate and low rate codes which are mostly used by cell-edge user equipments.

As the number of uplink user equipments and/or supporting base stations increases, the load on the backhaul network increases and hence the method with a low demand on backhaul capacity becomes applicable. However, by exchanging the soft data bits, better link quality is obtained as compared to the case when hard data bits are exchanged. This enhancement is achieved at a reasonable cost, such as e.g. 5 times more the required backhaul capacity for exchanging hard bits. Embodiments of the present method also provide less complexity as compared to the case when hard data bits are exchanged, since there is no need to do CRC check at base stations before the exchange has taken place.

Therefore, it is advantageous to have an intermediate option which provides not only better link performance as compare to the case when the decoded hard data bits are exchanged but also requires lower backhaul capacity than when the demodulated soft bits are exchanged. The present method, according to some embodiments, does not require additional complexity and can be simpler to implement than the existing methods. Thus the performance of the wireless communication system is improved.

Other objects, advantages and novel features of the invention will become apparent from the following detailed description of the invention.

BRIEF DESCRIPTION OF THE DRAWINGS

The invention is described in more detail with reference to attached drawings illustrating exemplary embodiments of the invention and in which.

DETAILED DESCRIPTION

The invention is defined as a method and arrangement in a serving base station and as a method and arrangement in a supporting base station, which may be put into practice in the embodiments described below. This invention may, however, be embodied in many different forms and is not to be considered as limited to the embodiments set forth herein; rather, these embodiments are provided so that this disclosure will be thorough and complete, and convey the scope of the invention to those skilled in the art.

Still other objects and features of the present invention may become apparent from the following detailed description considered in conjunction with the accompanying drawings. It is to be understood, however, that the drawings are designed solely for purposes of illustration and not as a definition of the limits of the invention, for which reference is to be made to the appended claims. It is further to be understood that the drawings are not necessarily drawn to scale and that, unless otherwise indicated, they are merely intended to conceptually illustrate the structures and procedures described herein.

Figure 1A:
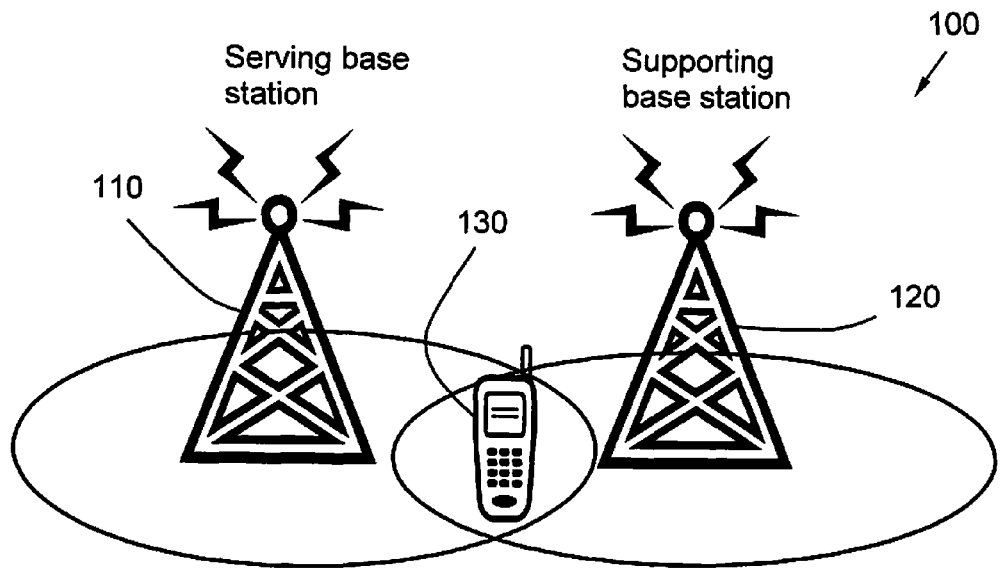
FIG. 1A is a schematic block diagram illustrating a wireless communication system according to some embodiments.

FIG. 1A depicts a wireless communication system 100, such as e.g. 3rd Generation Partnership Project (3GPP) Long Term Evolution (LTE), LTE-Advanced, Evolved Universal Terrestrial Radio Access Network (E-UTRAN), Universal Mobile Telecommunications System (UMTS), Global System for Mobile communications/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), just to mention some few options.

In the following, the present methods and arrangements are further elaborated with specific reference to LTE systems in Frequency Division Duplex (FDD) mode and more particularly with respect to the uplink in LTE. Thus the wireless communication system 100 is described as an LTE system throughout the rest of the description, for enhanced comprehension and readability. However, it is obvious to a skilled person that corresponding concepts could also be applied in other wireless communication systems 100.

The wireless communication system 100 comprises a serving base station 110, a supporting base station 120 and a user equipment 130, arranged to communicate with each other. The user equipment 130 transmits radio signals comprising information data to be received by the serving base station 110 and the supporting base station 120. The purpose of the illustration in FIG. 1a is to provide a general overview of the present methods and the functionalities involved. The serving base station 110 and the supporting base station 120 are cooperative base stations, which are cooperating in interpreting signalling received from the user equipment 130.

The serving base station 110 and the supporting base station 120 may, respectively, be referred to as e.g. a NodeB, an evolved Node B (eNB, or eNode B), a base transceiver station, Access Point Base Station, base station router, or any other network node configured for communication with the user equipment 130 over a wireless interface, depending e.g. of the radio access technology and terminology used. In the rest of the description, the term "serving base station" will be used for the serving base station 110, and the term "supporting base station" will be used for the supporting base station 120, in order to facilitate the comprehension of the present methods and arrangements.

It may be noted that the roles within a system 100 of cooperative base stations 110, 120, the roles of the serving base station 110 and the supporting base station 120 may as well be reversed, such that according to some embodiments the base station 120 becomes the serving base station of the user equipment 130 and the base station 110 becomes the supporting base station, as e.g. the user equipment signal strength changes, or load balancing issues suggests a different role distribution, such that the originally serving base station 110 becomes the supporting base station 120, and vice versa. Further, a particular cooperative base station 110, 120 may simultaneously be the serving base station for one or more user equipment 130 and act as supporting base station for other one or more user equipment units.

The user equipment 130 may be represented by e.g. a wireless communication terminal, a mobile cellular phone, a Personal Digital Assistant (PDA), a wireless platform, a laptop, a computer or any other kind of device capable to communicate wirelessly with the serving base station 110 and/or supporting base station 120.

The serving base station 110 controls the radio resource management within the cell, such as e.g. allocating radio resources to user equipment 130 within the cell and ensuring reliable wireless communication links between the serving base station 110 and the user equipment 130 e.g. by means of outer Automatic Repeat reQuest (ARQ), Forward Error Correction (FEC), or even Hybrid Automatic Repeat-Request. (HARQ).

Figure 1B:
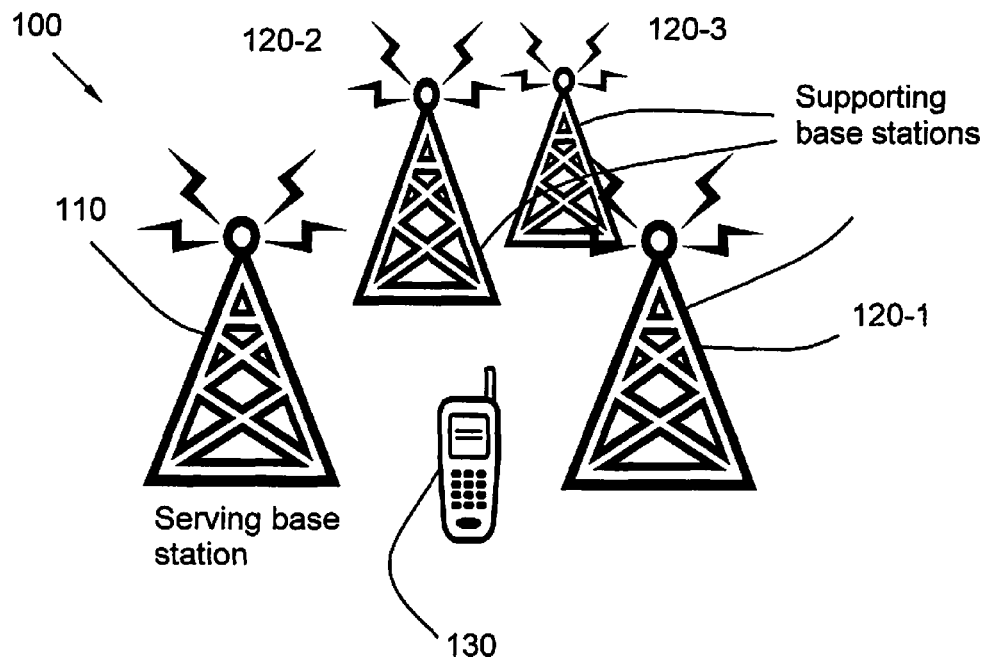
FIG. 1B is a schematic block diagram illustrating a wireless communication system according to some embodiments.

FIG. 1B illustrates an alternative embodiment of the wireless communication system 100 of cooperative base stations 110, 120-1, 120-2, 120-3. The wireless communication system 100 in FIG. 1b comprises a plurality of supporting base stations 120-1, 120-2, 120-3.

Radio signals transmitted from the user equipment 130 may be received by the serving base station 110 and at least some of the supporting base stations 120-1, 120-2, 120-3.

The serving base station 110 and the supporting base stations 120-1, 120-2, 120-3 are configured to communicate with each other over a backhaul network or an intra base station communication link such as e.g. X2.

In general, the purpose of cooperation between the serving and supporting base stations 110, 120-1, 120-2, 120-3 is to improve the link quality especially for the cell-edge user equipment 130. Basically the serving base station 110 may utilize the information received from at least one supporting base station 120-1, 120-2, 120-3 to improve the performance of the user equipment 130. The information is provided to the serving base station 110 via the backhaul network. As previously discussed, the existing solutions suggest three alternatives namely as exchanging the I/Q samples, the demodulated soft bits and the decoded hard data bits.

However, there are situations when the user equipment 130 has utilized large signal constellations even at low or intermediate code rate for transmission. In this case the required backhaul capacity for exchanging the demodulated soft bits seems to be high especially when the number of user equipment units 130, as well as the number of supporting base stations 120-1, 120-2, 120-3 increases. In such cases, exchanging the decoded data bits becomes the only feasible option, but the limited performance gain demonstrated by such approach makes the efforts to facilitate the cooperation between the base stations 110, 120-1, 120-2, 120-3 questionable.

Therefore, according to embodiments of the present method, the exchange information from the supporting base stations 120-1, 120-2, 120-3 to the serving base station 110 is the soft values for the decoded information bits. By sending the soft values for the decoded information bits, better performance is provided, with reduced complexity, than exchanging the decoded hard data bits. Further, embodiments of the present method requires less backhaul capacity than exchanging demodulated soft bits without decoding the information bits.

Figure 2:
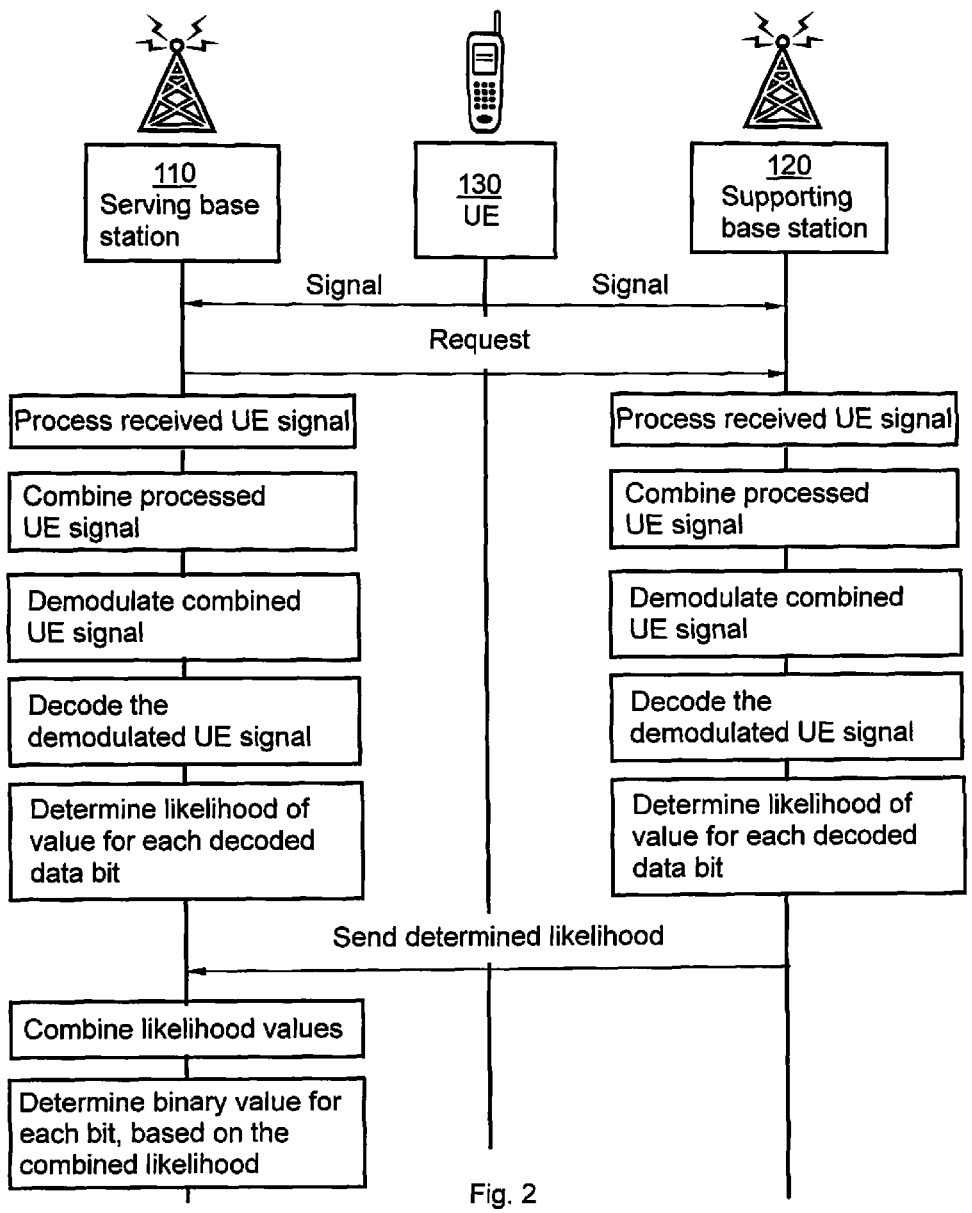
FIG. 2 is a combined flow chart and block diagram illustrating an embodiment of the present method.

FIG. 2 illustrates an embodiment of signalling performed between the serving base station 110, the supporting base station 120 and the user equipment 130. It is to be understood that although only one supporting base station 120 is illustrated in FIG. 2, for clarity reasons, a plurality of supporting base stations 120-1, 120-2, 120-3 may be involved in the present method, as already discussed in the description of FIG. 1B. Thus whenever one supporting base station 120 is referred to in the subsequent description, a plurality of supporting base stations 120-1, 120-2, 120-3 may be involved.

An exemplary embodiment of the present method will now be described in a number of method steps. It is to be noted that the method steps according to some embodiments may be performed in another sequential order than the order of presentation indicates. Also, it may be noted that some of the described method steps are optional and only comprised within some embodiments.

In a first method step, the user equipment 130 transmits a signal to be received by the serving base station 110 and the supporting base station 120. The signal comprises information data bits representing different binary values, which binary values in turn represent, or is to be interpreted as, any information.

When the serving base station 110 receives the information data from the user equipment 130, it may determine to work in cooperative mode and exchange information with supporting base stations 120 or not. Further, if the serving base station 110 determines to work in cooperative mode, it may select in which cooperative mode to operate. This issue is further discussed and exemplified in association with FIG. 3B. The selection of mode of operation and/or method of cooperative operation may be based on radio propagation conditions such as e.g. radio traffic intensity, radio propagation conditions, backhaul capacity, used modulation scheme, used coding scheme, bit error rate and/or signal to noise ratio. It may also be based on e.g. statistics concerning the network load and/or other information. It may for example be known that the traffic load in a particular cell is very dense in daytime but considerably less in night time.

If the serving base station 110 selects to use the present method for determining the binary value of information data received from the user equipment 130, by using a supportive likelihood value received from the supporting base station 120, a request for a determined likelihood value of the decoded user equipment information data may be transmitted to the supporting base station 120. Decoded soft data bits is another term that may be used for the determined likelihood value of the decoded user equipment information data.

In this mode, to respond to the request from the serving base station 110, the supporting base station 120 processes the received signal at its antennas with its corresponding receiver algorithms. The receiver algorithms employ methods for mitigating the interference as well as channel estimation and equalization. The processed received signals from the received antennas based on the combining algorithms are combined and may eventually be demodulated. Many operation steps may take place on the baseband signal such as interference mitigation, channel estimation, equalization, combing over antennas (IRC or MRC), etc., according to different embodiments, which is in FIG. 2 referred to as combining the processed user equipment signal. The outcome of the demodulator is soft bits corresponding to transmitted coded bits which can be used by the decoder. In the next step the decoding is performed.

Basically, the decoder provides a measure for each transmitted data bit that how likely the transmitted bit is "0" or "1". Something like: "I am 90% certain that this bit is 0", just to exemplify. This measure is also called a soft bit or equivalently a soft data bit, as already discussed.

In the approach proposed here, the decoder at the supporting base station 120 does not make any decision based on the likelihood values/soft bits but send them as they are to the serving base station 110. It may be mentioned that these soft bits may be quantized similarly to the demodulated soft bits mentioned above in order to be sent.

The corresponding method steps as above described for the supporting base station 120 is executed at the serving base station 110, where the decoded likelihood values are generated at the decoder output. These likelihood values are combined with the likelihood values provided by the supporting base station 120. The combining may comprise e.g. an addition of values, and/or calculating an average likelihood value of the first likelihood value and the supportive likelihood value. Further, the binary value for each bit of the information data transmitted from the user equipment 130 may be determined, based on the combined likelihood values. However, according to some embodiments, it may be determined which of the serving base station 110 and supportive base station 120 that has received the least distorted information data from the user equipment 130.

Further, the likelihood value, which has been generated by the one of the serving base station 110 and the supporting base station 120, determined to having received the least distorted information data from the user equipment 130 may be selected.

Each combined soft bit is then used as a measure showing the likelihood that the corresponding transmitted data bit is "0" or "1". The decision on the transmitted data bits are made based on these likelihoods.

When the information data transmitted from the user equipment 130 is decoded according to the present method, error detection on the established binary value for each bit of the information data may be performed. The error detection may comprise e.g. a Cyclic Redundancy Check (CRC), a parity bit, a check sum (based on e.g. modular arithmetic, the Luhn algorithm and/or the Verhoeff algorithm), a hash value, horizontal redundancy check, vertical redundancy check, longitudinal redundancy check, diagonal parity, hamming code, Berger code or any other arbitrary error detection method may be used. CRC is a type of hash function used to produce a checksum on the transmitted information data, which may be used to detect and correct transmission errors in the data.

Further, the serving base station 110 may send a response to the user equipment 130 concerning the received, decoded and error checked information data. The response may be either an acknowledgment "ACK", if no error is detected in the information data or a non-acknowledgment "NACK" if an error is detected.

The error detection and the response may be based on Automatic Repeat reQuest (ARQ), also known as Automatic Repeat Query which is an error-control method for data transmission that uses acknowledgements, i.e. messages sent by the serving base station 110 indicating that the it has correctly received the information data from the user equipment 130, and timeouts i.e. specified periods of time allowed to elapse before an acknowledgment is to be received, to achieve reliable data transmission. If the user equipment 130 does not receive an acknowledgment before the timeout, it may re-transmit the information data until an acknowledgment is received, or until the user equipment 130 exceeds a predetermined number of re-transmissions.

Figure 3A:
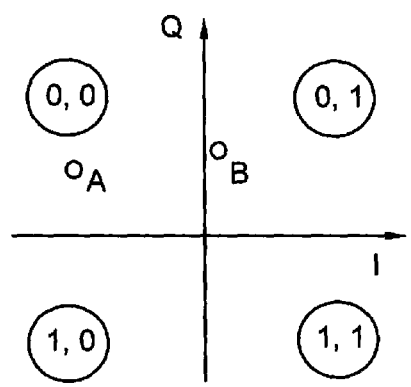
FIG. 3A is a schematic illustration of received signals according to some embodiments.

FIG. 3A is a schematic constellation diagram, illustrating a representation of a signal modulated by a digital modulation scheme such as e.g. Quadrature Amplitude Modulation (QAM), according to some embodiments. It displays in an abstract sense, possible two-bit binary values (0,0; 0,1; 1,0; 1,1) that may be selected by a given modulation scheme as points in the complex plane. It may be mentioned that a multitude of modulation schemes may be used, such as e.g. QAM (such as e.g. 4 QAM, 16 QAM, 64 QAM), Phase-Shift Keying (PSK), Quadrature Phase-Shift Keying (QPSK), Binary Phase-Shift Keying (BPSK) etc.

A radio signal is transmitted by the user equipment 130 and received by the serving base station 110 and/or the supporting base station 120. In the illustration, the received signals A and B are displayed as a two-dimensional scatter diagram in the complex plane at symbol sampling instants. Signal A may in this example be received by the serving base station 110 and the signal B may be received by the supporting base station 120.

In a radio transmission under ideal circumstances, the received signals A and B respectively would be identical and received within the intended respective representation of possible binary values (0,0; 0,1; 1,0; 1,1). However, due to different interference and distortion in the signals A, B respectively during transmission, the signal A, received by the serving base station 110 and the signal B received by the supporting base station 120 are different. Thus it will demodulate incorrectly if the corruption has caused the received symbol A, B to move closer to another constellation point than the one transmitted.

When receiving the signal at serving base station 110 and the supporting base station 120, the respective demodulator examines the received respective symbol A, B, which may have been corrupted by channel and/or the receiver e.g. additive white Gaussian noise, distortion, phase noise or interference etc.

At the supporting base station 120, a likelihood value of which binary value each received bit of information data is considered to represent is determined. It may be considered that the received signal B is to be interpreted as 0, 1 with 55% likelihood. The likelihood value may be estimated based on measuring the distance between the closest ideal binary value in the constellation diagram, in this case 0, 1 and the received signal B.

The same procedure is performed in parallel in the serving base station 110, i.e. for the there received signal A, a likelihood value is computed. It may be considered that the received signal A is to be interpreted as 0, 0 with 85% likelihood.

The likelihood value may comprise e.g. an integer which could be drawn e.g. from the range [−127, 127], where: −127 may mean "certainly 0", −100 may mean "very likely 0", 0 may mean "it could be either 0 or 1", 100 may mean "very likely 1", 127 may mean "certainly 1", just to mention one possible format option for the likelihood value.

Thereafter, the supporting base station 120 (or the plurality of supporting base stations 120-1, 120-2, 120-3, as already discussed) provide the serving base station 110 with the computed likelihood value. At the serving base station 110, the likelihood value received from the supporting base station 120, which in this case may comprise the information "the received signal B is to be interpreted as a 0 bit and a 1 bit, with 55% likelihood", is combined with the likelihood value computed at the serving base station 110, i.e. "the received signal A is to be interpreted as 0, 0 with 85% likelihood".

The decoder of the serving base station 110 uses this received information in order to decode the received signal into hard bits, i.e. to determine the binary value of each received bit of data. The combination may comprise e.g. addition of the likelihood values, computing a mean value of the likelihood values or just selecting the value of the signal that has been received with the least disturbance, to mention some possible methods. Further, the decoding may be based on e.g. Maximum Likelihood (ML) or Maximum A Posteriori (MAP), or majority logic for some block codes, etc. The Viterbi algorithm may use ML approach. Turbo decoder may use MAP approach. In MAP approach some likelihood values are exchanged in form of Log-Likelihood Ratio (LLR), i.e. the logarithm of likelihood of being 0 to likelihood of being 1, for a bit.

The output of the decoder is thus a stream of binary values zeroes and ones, representing the information data transmitted by the user equipment 130. According to some embodiments, these decoded data bits may be checked for transmission errors by applying a error detection on the established binary value for each bit of the information data. The error detection may be e.g. CRC, as already mentioned. Depending of the result of the error detection, either an acknowledgment (ACK) may be sent to the user equipment 130, if no error is detected in the information data, or a non-acknowledgment (NACK) if an error is detected.

Figure 3B:
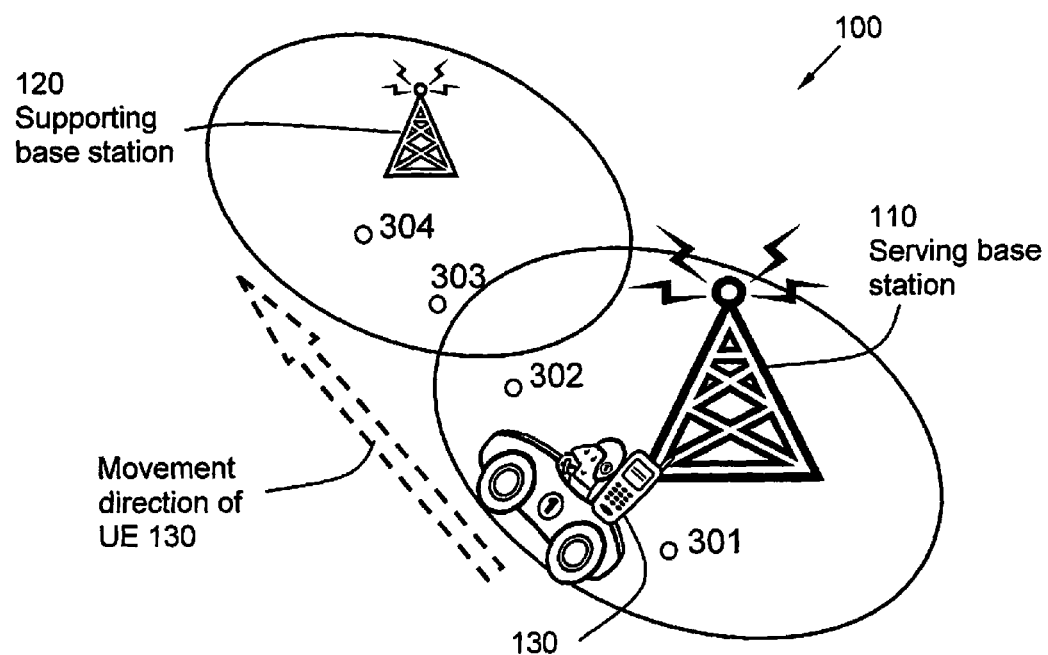
FIG. 3B is a schematic block diagram illustrating a wireless communication system and an exemplary embodiment of the present method.

FIG. 3B illustrates an exemplary non limiting embodiment of the present method. The wireless communication network 100 comprises the serving base station 110 and the supporting base station 120. The user equipment 130 is initially situated at a first point 301, situated adjacent to the serving base station 110, having a line of sight radio connection to the serving base station 110. The user equipment 130 is then moving in a direction towards the supporting base station 120, passing a second point 302 and a third point 303, which are situated in the cell edge zone of the serving base station 110. The exemplary travel of the user equipment 130 ends at a fourth point 304, situated closer to the supporting base station 120 than to the serving base station 110.

At the point 301, the radio propagation conditions for signals transmitted between the user equipment 130 and the serving base station 110 in this example may be considered to be excellent. In such case, the added value of involving one or more supporting base stations 120 for decoding the user equipment signals may be considered as rather limited, while the overall system complexity and overhead signalling may increase. Thus it may be determined by the serving base station 110, when the user equipment 130 is situated at point 301, that the cooperative base station mode is not to be used for interpreting the user equipment signals. The decision may be based on the radio propagation conditions as determined e.g. by letting the user equipment 130 transmit a reference signal and/or measuring any signal parameter such as radio propagation conditions, backhaul capacity, used modulation scheme, used coding scheme, bit error rate and/or signal to noise ratio.

When the user equipment 130 is approaching the second point 302, the radio propagation conditions may have changed. Thus it may be determined to be an advantage to operate in cooperative base station mode when decoding the user equipment signals. However, due to an estimated low radio traffic intensity, the serving base station 110 may select to operate in the cooperative approach with the supporting base station 120 in I/Q mode, which may render a more correct result.

As the user equipment 130 continues to travel towards the third point 303, the radio propagation conditions may change again. An increasing traffic load due to more active user equipments within the system 100 may render it inappropriate to continue receiving information from the supporting base station 120 in I/Q mode. Thus a change into the present method may be appropriate, to reduce the load on the backhaul network as less overhead information is exchanged. Thus the user equipment signals may be decoded by the serving base station 110 according to the present method, as the user equipment 130 is finally arriving at the fourth point 304 and terminates the radio transmission in this imaginary example of how the present method may be used according to some embodiments.

Figure 4:
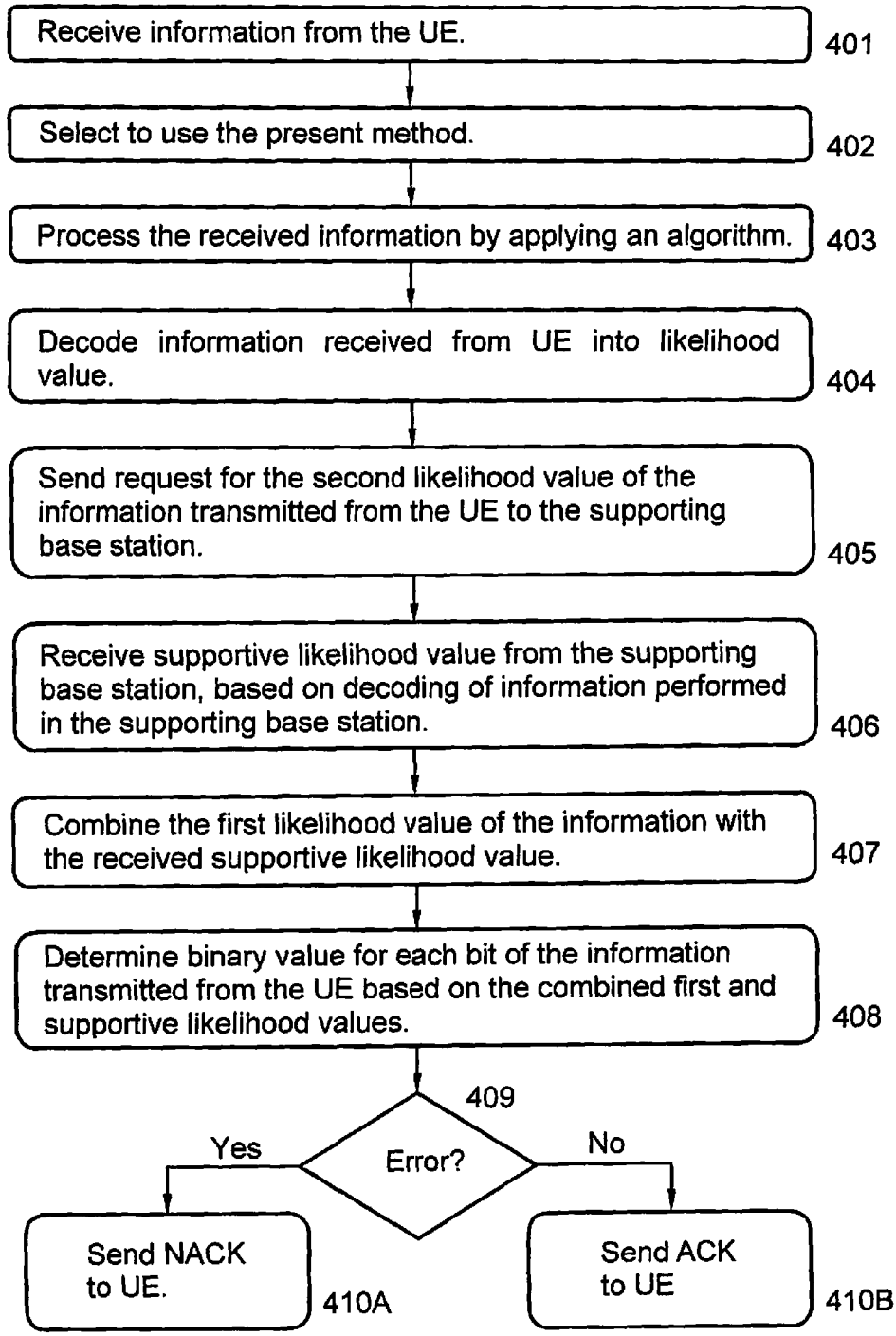
FIG. 4 is a flow chart illustrating embodiments of the present method in a serving base station.

FIG. 4 is a flow chart illustrating embodiments of method steps 401-410 performed in a serving base station 110. The method steps 401-410 aims at determining a binary value of information data received from a user equipment 130, by using a supportive likelihood value received from a supporting base station 120. The user equipment 130 transmits information data to be received both by the serving base station 110 and the supporting base station 120. According to some embodiments may a plurality of supporting base stations 120-1, 120-2, 120-3 receive the information data transmitted by the user equipment 130.

The serving base station 110 and the supporting base station 120 may be comprised in a wireless communication system 100 e.g. a LTE radio network. The serving base station 110 and the supporting base station 120 may be e.g. an evolved node B, eNB, according to some embodiments.

The serving base station 110 may according to some embodiments be configured to also function as a supporting base station, in relation to the user equipment 130. Further the serving base station 110 may be configured to function simultaneously as a serving base station for some user equipment units and supporting base station for some user equipment units, according to some embodiments.

To appropriately determining a binary value of information data received from a user equipment 130, the method may comprise a number of method steps 401-410.

It is however to be noted that some of the described method steps are optional and only comprised within some embodiments. Further, it is to be noted that the method steps 401-410 may be performed in a somewhat different chronological order and that some of them, e.g. step 404 and step 405, may be performed simultaneously or in a rearranged chronological order. The method may comprise the following steps:

Step 401

Information data is received from the user equipment 130.

Step 402

This step is optional and may only be performed within some embodiments.

It may be selected to use the present method of determining the binary value of information data received from the user equipment 130, based on: radio traffic intensity, radio propagation conditions, backhaul capacity, used modulation scheme, used coding scheme, bit error rate and/or signal to noise ratio, etc.

Step 403

This step is optional and may only be performed within some embodiments.

The received information data may be processed by applying an algorithm. Such algorithm may comprise e.g. demodulation.

Step 404

Information data bits received from the user equipment 130 are decoded into a first likelihood value, without determining a binary value for each bit of the information data.

Step 405

This step is optional and may only be performed within some embodiments.

A request for the second likelihood value of the information data transmitted from the user equipment 130 may be sent to the supporting base station 120. The request may optionally comprise information concerning the format to be used for the second likelihood value, according to some embodiments.

Step 406

A supportive likelihood value of the information data bits transmitted from the user equipment 130 is received, from the supporting base station 120, which supportive likelihood value is based on a decoding of the information data bits performed in the supporting base station 120.

The step of receiving a supportive likelihood value of the information data bits transmitted from the user equipment 130, from the supporting base station 120 may optionally comprise receiving a supportive likelihood value of the information data bits transmitted from the user equipment 130, from each of the supporting base stations 120-1, 120-2, 120-3, wherein each respective supportive likelihood value may be based on a decoding of information data bits performed in each of the supporting base stations 120-1, 120-2, 120-3.

Step 407

The first likelihood value of the decoded information bits is combined with the received supportive likelihood value of the decoded information bits.

The combining of the first likelihood value with the received supportive likelihood value may according to some embodiments comprise determining which of the serving base station 110 and supportive base station 120 that has received the least distorted information data from the user equipment 130, and selecting the likelihood value, which has been generated by the one of the serving base station 110 and the supportive base station 120, determined to have been received the least distorted information data from the user equipment 130.

However, according to some embodiments, the step of combining the first likelihood value with the received supportive likelihood value comprises calculating an average likelihood value of the first likelihood value and the supportive likelihood value.

The step of combining the first likelihood value of the decoded information bits with the received supportive likelihood value of the decoded information bits may optionally comprise combining the first likelihood value of the decoded information bits with all the received supportive likelihood values of the decoded information bits, received from a plurality of supporting base stations 120-1, 120-2, 120-3.

Step 408

A binary value for each bit of the information data transmitted from the user equipment 130 is determined, based on the combined first and supportive likelihood values.

According to some optional embodiments may the determination of the binary value for each bit of the information data transmitted from the user equipment 130 be based on the calculated combined likelihood value, such as e.g. the average likelihood value.

Step 409

This step is optional and may only be performed within some embodiments.

An error detection on the established binary value for each bit of the information data may be performed. The error detection may comprise e.g. CRC, according to some embodiments.

Step 410

This step is optional and may only be performed within some embodiments.

A response may be sent to the user equipment 130 concerning the received information data, which response comprises either an acknowledgment (ACK), if no error is detected in the information data, or a non-acknowledgment (NACK) if an error is detected.

Figure 5:
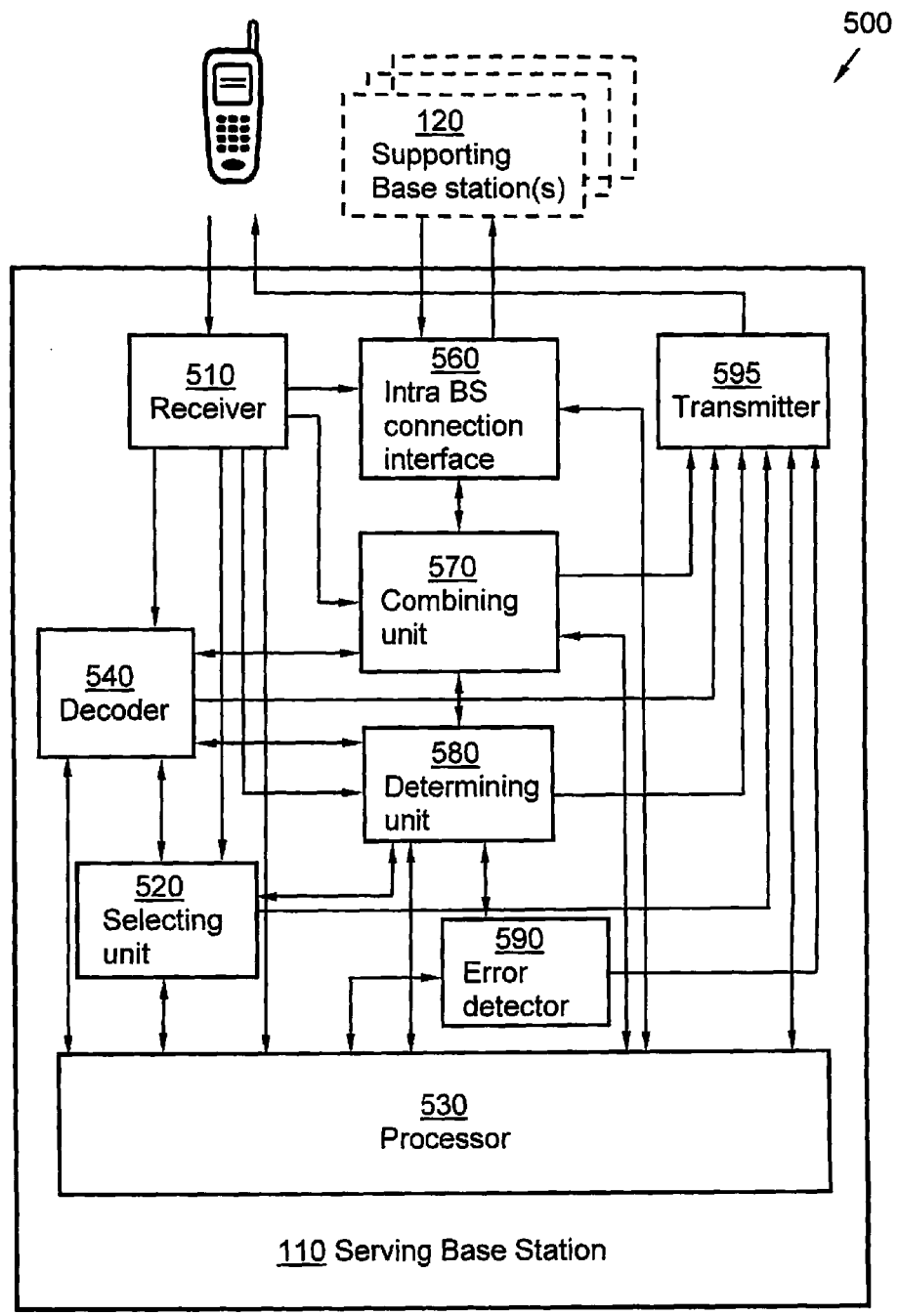
FIG. 5 is a schematic block diagram illustrating embodiments of a serving base station arrangement.

FIG. 5 schematically illustrates an arrangement 500 in a serving base station 110. The arrangement 500 is adapted to perform any, some or all of the method steps 401-410 in order to determine a binary value of information data received from a user equipment 130. The binary bit value is determined by using a supportive likelihood value received from a supporting base station 120. The user equipment 130 transmits information data to be received both by the serving base station 110 and the supporting base station 120.

The serving base station 110 and the supporting base station 120 may be comprised in a wireless communication system 100. The wireless communication system 100 may be e.g. a LTE radio network and the base station 110 may be e.g. an evolved node B, eNB, according to some embodiments.

The serving base station 110 may according to some embodiments be configured to also function as a supporting base station, in relation to the user equipment 130. Further the serving base station 110 may be configured to function simultaneously as a serving base station for some user equipment units and supporting base station for some user equipment units, according to some embodiments.

In order to perform the method steps 401-410 correctly, the serving base station arrangement 500 comprises e.g. a decoder 540. The decoder 540 is configured to decode information data received from the user equipment 130 into a first likelihood value, without determining a binary value for each bit of the information data. Also, the arrangement 500 further comprises, in addition, an intra base station connection interface 560, configured to receive a supportive likelihood value of the information data transmitted from the user equipment 130, from the supporting base station 120. Further, the arrangement in addition also comprises a combining unit 570. The combining unit 570 is configured to combine the first likelihood value with the received supportive likelihood value. The arrangement 500 further also comprises a determination unit 580. The determination unit 580 is configured to determine a binary value for each bit of the information data transmitted from the user equipment 130, based on the combined first and supportive likelihood values.

Further, according to some embodiments, the serving base station arrangement 500 may comprise a receiver 510. The receiver 510 may be configured to receive information data from the user equipment 130. In addition, the arrangement 500 may comprise a processor 530. The processor 530 may be configured to process the received information data by applying an algorithm.

The processor 530 may be represented by e.g. a Central Processing Unit (CPU), a microprocessor, or other processing logic that may interpret and execute instructions. The processor 530 may perform all data processing functions for inputting, outputting, and processing of data including data buffering and device control functions, such as call processing control, user interface control, or the like.

Furthermore, the intra base station connection interface 560 comprised within arrangement 500 may optionally be further configured to send a request for the second likelihood value of the information data transmitted from the user equipment 130, to the supporting base station 120.

Optionally the arrangement 500 may comprise an error detector 590, configured to perform an error detection on the established binary value for each bit of the information data. Further the arrangement 500 optionally may comprise a transmitter 595, according to some embodiments. The transmitter 595 may be configured to transmit a response to the user equipment 130 concerning the received information data, which response comprises either an acknowledgment (ACK), if no error is detected in the information data, or a non-acknowledgment (NACK) if an error is detected.

The arrangement 500 according to some embodiments comprises a selecting unit 520. The selecting unit 520 may be configured to determine to use the present method of determining the binary value of information data received from the user equipment 130, based on one or more of the following: radio traffic intensity, radio propagation conditions, backhaul capacity, used modulation scheme, bit error rate and/or signal to noise ratio.

It is to be noted that any internal electronics of the serving base station 110 and/or the serving base station arrangement 500, not completely necessary for understanding the present method according to the method steps 401-410 has been omitted from FIG. 5, for clarity reasons.

Further, it is to be noted that some of the described units 510-580 comprised within the arrangement 500 in the serving base station 110 are to be regarded as separate logical entities but not with necessity separate physical entities. To mention just one example, the receiving unit 510 and the transmitter 595 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the serving base station 110 and the user equipment 130 may comprise both traffic and control signals e.g. paging signals/messages for incoming calls, which may be used to establish and maintain a voice call communication with another party or to transmit and/or receive data, such as SMS, e-mail or MMS messages, with a remote user equipment.

The method steps 401-410 in the serving base station 110 may be implemented through one or more processors 530 in the serving base station 110, together with computer program code for performing the functions of the present method steps 401-410. Thus a computer program product, comprising instructions for performing the method steps 401-410 in the serving base station 110 may determine the binary value of information data received from the user equipment 130, by using a supportive likelihood value received from the supporting base station 120, when the computer program product is loaded into the processor 530.

The computer program product mentioned above may be provided for instance in the form of a data carrier carrying computer program code for performing the method steps according to the present solution when being loaded into the processor unit 530. The data carrier may be e.g. computer readable storage medium such as a hard disk, a CD ROM disc, a memory stick, an optical storage device, a magnetic storage device or any other appropriate medium such as a disk or tape that can hold machine readable data. The computer program code can furthermore be provided as program code on a server and downloaded to the serving base station 110 remotely, e.g. over an Internet or an intranet connection.

Further, a computer program product comprising instructions for performing at least some of the method steps 401-410 may be used for implementing the previously described method in the serving base station 110 for determine the binary value of information data received from the user equipment 130, by using a supportive likelihood value received from the supporting base station 120, when the computer program product is run on a processor 530 comprised within the serving base station 110.

Figure 6:
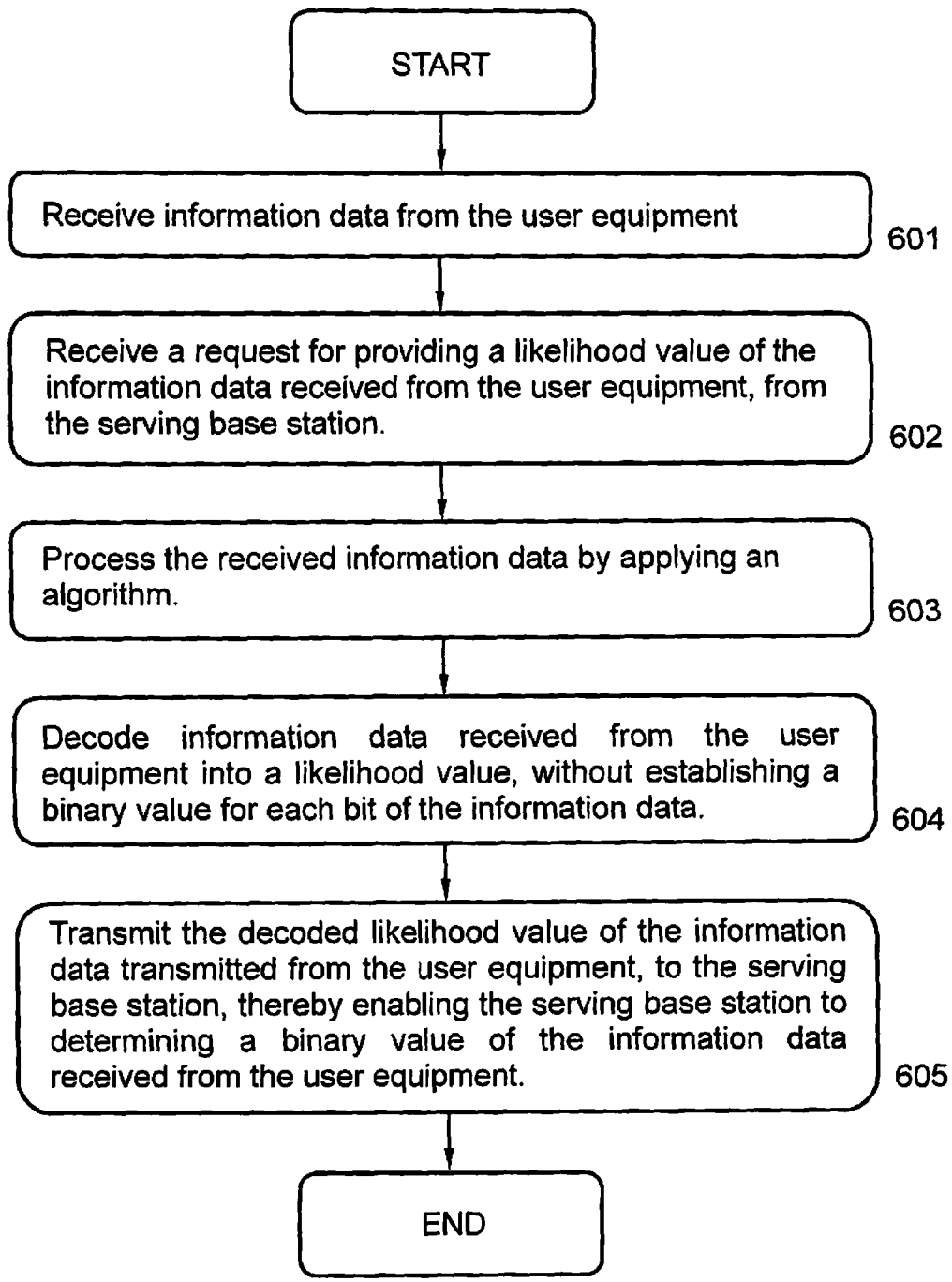
FIG. 6 is a flow chart illustrating embodiments of a method in a supporting base station.

FIG. 6 is a flow chart illustrating embodiments of method steps 601-605 performed in a supporting base station 120. The method steps 601-605 aims at assisting a serving base station 110 in determining a binary value of information data received from a user equipment 130. The user equipment 130 transmits information data to be received both by the serving base station 110 and the supporting base station 120. According to some embodiments may a plurality of supporting base stations 120-1, 120-2, 120-3 receive the information data transmitted by the user equipment 130.

The supporting base station 120 and the serving base station 110 may be comprised in a wireless communication system 100 e.g. a LTE radio network. The serving base station 110 and the supporting base station 120 may be e.g. an evolved node B, eNB, according to some embodiments.

The supporting base station 120 may according to some embodiments be configured to also function as a serving base station, in relation to the user equipment 130. Further the supporting base station 120 may be configured to function simultaneously as a serving base station for some user equipment units and supporting base station for some user equipment units, according to some embodiments.

To appropriately assist the serving base station 110 in determining the binary value of information data received from the user equipment 130, the method may comprise a number of method steps 601-605.

It is however to be noted that some of the described method steps are optional and only comprised within some embodiments. Further, it is to be noted that the method steps 601-605 may be performed in a somewhat different chronological order and that some of them may be performed simultaneously or in a rearranged chronological order. The method may comprise the following steps:

Step 601

Information data is received from the user equipment 130.

Step 602

This step is optional and may only be performed within some embodiments.

A request for providing a likelihood value of the information data received from the user equipment 130, may be received from the serving base station 110.

Step 603

This step is optional and may only be performed within some embodiments.

The received information data may be processed by applying an algorithm. Such algorithm may comprise e.g. demodulation.

Step 604

The information data received from the user equipment 130 is decoded into a likelihood value, without establishing a binary value for each bit of the information data.

Step 605

The decoded likelihood value of the information data transmitted from the user equipment 130 is transmitted to the serving base station 110, thereby enabling the serving base station 110 to determining a binary value of the information data received from the user equipment 130.

Figure 7:
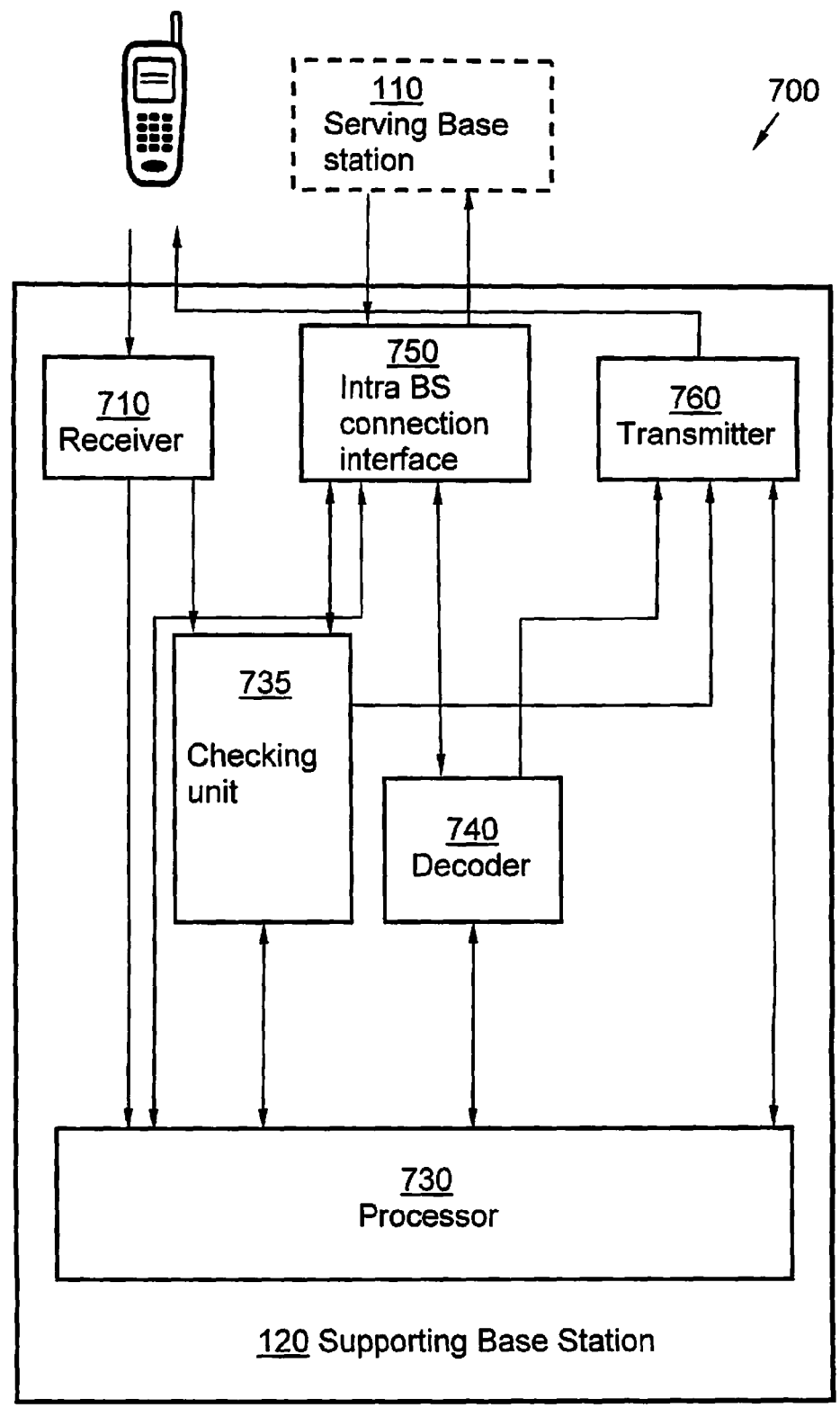
FIG. 7 is a schematic block diagram illustrating embodiments of a supporting base station arrangement.

FIG. 7 schematically illustrates an arrangement 700 in a supporting base station 120. The arrangement 700 is configured to perform any, some or all of the method steps 601-605 in order to assist the serving base station 110 in determining a binary value of information data received from a user equipment 130.

The user equipment 130 transmits information data to be received both by the serving base station 110 and the supporting base station 120. The binary bit value is determined at the serving base station 110 by using a supportive likelihood value received from a supporting base station 120. According to some embodiments, the binary bit value may be determined at the serving base station 110 by using a plurality of supportive likelihood values received from a plurality of supporting base stations 120-1, 120-2, 120-3.

The serving base station 110 and the supporting base station 120 may be comprised in a wireless communication system 100. The wireless communication system 100 may be e.g. a LTE radio network and the base station 110 may be e.g. an evolved node B, eNB, according to some embodiments.

The supporting base station 120 may according to some embodiments be configured to also function as a serving base station, in relation to the user equipment 130. Further the supporting base station 120 may be configured to function simultaneously as a serving base station for some user equipment units and supporting base station for some user equipment units, according to some embodiments.

In order to perform the method steps 601-605 correctly, the supporting base station arrangement 700 comprises a plurality of units such as e.g. a decoder 740. The decoder 740 is configured to decode information data received from the user equipment 130 into a likelihood value, without determining a binary value for each bit of the information data. Also, the supporting base station arrangement 700 comprises an intra base station connection interface 750. The intra base station connection interface 750 is configured to transmit the decoded likelihood value of the information data transmitted from the user equipment 130, to the serving base station 110.

Also, the arrangement 700 further may comprise, in addition, a receiver 710, configured to receive information data from the user equipment 130, according to some embodiments.

The intra base station connection interface 750 may in addition be further configured to receive a request for providing a likelihood value of the information data received from the user equipment 130, from the serving base station 110.

Furthermore, according to some embodiments the arrangement 700 may comprise a processor 730. The processor 730 may be configured to process the received information data by applying an algorithm.

The processor 730 may be represented by e.g. a Central Processing Unit (CPU), a microprocessor, or other processing logic that may interpret and execute instructions. The processor 730 may perform all data processing functions for inputting, outputting, and processing of data including data buffering and device control functions, such as call processing control, user interface control, or the like.

Further the arrangement 700 optionally may comprise a transmitter 760, according to some embodiments. The transmitter 760 may be configured to transmit signals to user equipments 130 within the cell.

Also, according to some further embodiments the supporting base station arrangement 700 optionally may in addition comprise a checking unit 735. The optional checking unit 735 may be adapted to run a performance check, according to some embodiments.

It is to be noted that any internal electronics of the supporting base station 120 and/or the supporting base station arrangement 700, not completely necessary for understanding the present method according to the method steps 601-605 has been omitted from FIG. 7, for clarity reasons.

Further, it is to be noted that some of the described units 710-795 comprised within the arrangement 700 in the supporting base station 120 are to be regarded as separate logical entities but not with necessity separate physical entities. To mention just one example, the receiver 710 and the transmitter 760 may be comprised or co-arranged within the same physical unit, a transceiver, which may comprise a transmitter circuit and a receiver circuit, which transmits outgoing radio frequency signals and receives incoming radio frequency signals, respectively, via an antenna.

The method steps 601-605 in the supporting base station 120 may be implemented through one or more processors 730 in the supporting base station 120, together with computer program code for performing the functions of the present method steps 601-605. Thus a computer program product, comprising instructions for performing the method steps 601-605 in the supporting base station 120 may assist the serving base station 110 in determining the binary value of information data received from the user equipment 130, by using a supportive likelihood value received from the supporting base station 120, when the computer program product is loaded into the processor 730.

The computer program product mentioned above may be provided for instance in the form of a data carrier carrying computer program code for performing the method steps according to the present solution when being loaded into the processor 730. The data carrier may be e.g. computer readable storage medium such as a hard disk, a CD ROM disc, a memory stick, an optical storage device, a magnetic storage device or any other appropriate medium such as a disk or tape that can hold machine readable data. The computer program code can furthermore be provided as program code on a server and downloaded to the serving base station 110 remotely, e.g. over an Internet or an intranet connection.

Further, a computer program product comprising instructions for performing at least some of the method steps 601-605 may be used for implementing the previously described method in the supporting base station 120 for assisting the serving base station 110 in determining the binary value of information data received from the user equipment 130, by using the supportive likelihood value received from the supporting base station 120, when the computer program product is run on a processor 730 comprised within the supporting base station 120.

Figure 8:
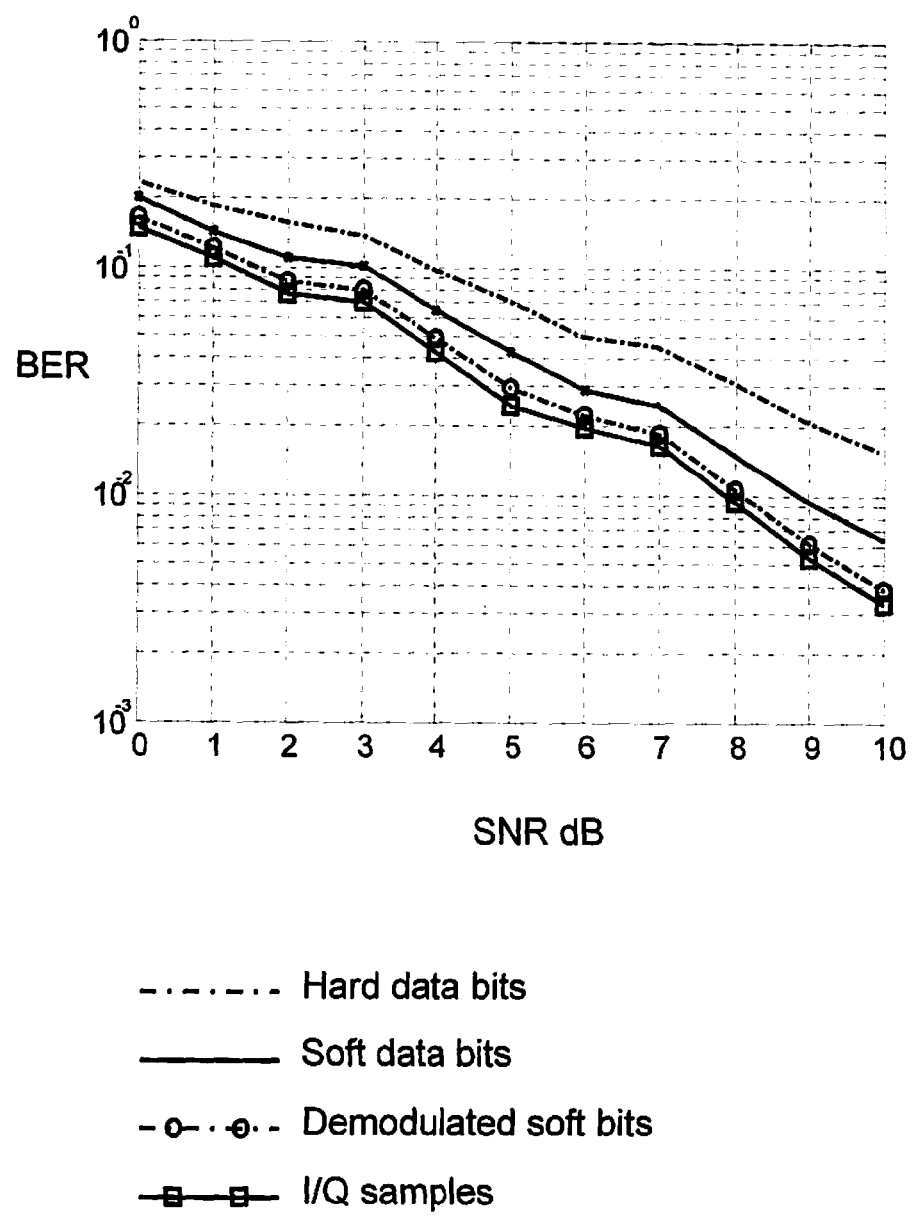
FIG. 8 is a schematic block diagram illustrating bit error rate performance versus signal to noise ratio according to embodiments of the present method and prior art methods.

FIG. 8 illustrates an example where one supporting base station 120 is cooperating with the serving base station 110 for uplink transmission of a user equipment 130 with one transmit antenna. In the diagram, bit error rate performance versus signal to noise ratio in dB for the user equipment 130 is illustrated. For simplicity, the base stations 110, 120 are also equipped with one receive antenna. Data blocks of 1024 bits may be encoded e.g. by a turbo encoder at rate ⅓ and modulated using e.g. 16-QAM modulation scheme. The performance is simulated when different types of information are exchanged between the base stations 110, 120.

The bit error rate performance is simulated for flat fading channels. FIG. 8 clearly demonstrates the superior link quality, here shown as bit error rate performance provided by exchanging the I/Q samples over the other options. Exchanging the decoded hard data bits exhibits the worst performance as may be expected. Moreover, it is observed that exchanging the decoded soft data bits according to the present method, between base stations 110, 120 provides superior link quality performance than exchanging the decoded hard data bits but is outperformed by exchanging the demodulated soft bits, as may be expected.

To compare the maximum required base station to base station interface capacity when the I/Q samples, demodulated soft bits, or decoded hard data bits are exchanged, the following example is provided.

In this example, an uplink transmission for a fully loaded 20 MHz FDD LTE system with normal cyclic prefix in a single user case is considered. One transmit antenna and two receive antennas at each base station 110, 120 are further assumed. The user equipment 130 utilizes the whole bandwidth during a transmission time interval (TTI) of 1 ms for data transmission on physical uplink shared channel (PUSCH).

Since the whole operating bandwidth may be allocated to PUSCH, the data transmission on PUSCH may utilize 100 resource blocks (RB). Each resource block contains 12 sub-carriers with sub-carrier spacing of 15 kHz. During each TTI of 1 ms, 14 SC-FDMA symbols may be transmitted where two of them may be used as the demodulation reference symbols. The turbo encoder at the parent rate ⅓ with constraint length 4 may be utilized for encoding each data block. Higher coding rates than ⅓ can be achieved by puncturing. The encoded block may be modulated employing one of the BPSK, QPSK, 16 QAM or 64 QAM schemes where 1, 2, 4 or 6 bits per modulated symbol is used, respectively.

At the supporting base station 120, the I/Q samples may be obtained after removal of cyclic prefix, selecting the assigned sub-carriers and performing FFT on the received SC-FDMA symbols during one TTI including both reference symbols and data symbols. Each I/Q sample is quantized to using 2Q bits where Q bits for real part and Q bits for imaginary part are used. Usually Q=8 may be used. Therefore the backhaul capacity required for exchanging the I/Q samples during 1 ms from a supporting base station with two receive antennas may be computed by:

Required backhaul capacity for I/Q samples exchange=(100[(RBs/SC-FDMA symbol)/antenna])·(12[sub-carriers/RB])·(1[I/Q symbol/sub-carrier])·(14[SC-FDMA symbol/TTI])·(2[antennas])·(2$Q$[bits/I/Q symbol])/(1 ms)=$Q$ 67.1875 [Mbps].

If Q=8 is used, the required backhaul capacity for exchanging I/Q samples becomes 537.5 Mbps, in this non-limiting example.

If the supporting base station 120 exchanges the demodulated soft bits, the I/Q samples are processed at the supporting base station 120. After channel estimation and equalization, the received data symbols from different antennas are combined based on the combing method and then are demodulated to generate soft bits. The number of soft bits depends on the modulation scheme. Each demodulated soft bit is assumed to be quantized by Q bits. Usually Q=5 may be assumed. Therefore the backhaul capacity for exchanging the demodulated soft bits may be given by:

Required backhaul capacity for demodulated soft bits exchange=(100[(RBs/SC-FDMA symbol))·(12[sub-carriers/RB])·(1[Mod symbol/sub-carrier])·(12[SC-FDMA symbol/TTI])·($M$ soft-bits/Mod symbol)·($Q$[bits/soft-bit])/(1 ms)=$MQ$ 14.4 [Mbps], where M is equal to 1, 2, 4 or 6 for BPSK, QPSK, 16 QAM or 64 QAM modulation schemes, respectively. If Q=5 is used, the required backhaul capacity for exchanging demodulated soft bits becomes 72 M Mbps. This capacity becomes 288 Mbps if 16-QAM is used, in this example.

If the supporting base station 120 is required to exchange the decoded hard bits, the demodulated soft bits are fed to a turbo decoder at the supporting base station 120 which provides the decoded bits that are tested by CRC for error detection. If the decoded bits pass the CRC check they are sent to the serving base station 110. In this case, the required backhaul capacity becomes (ignoring the probability of CRC failure):

Required backhaul capacity for hard data bits exchange=($N$ data-bits/TTI)/(1 ms)=$N$ kbps, where N is the number of data bits transmitted during 1 ms. Assuming that one data block is transmitted during 1 ms, the number of data bits depends on the coding rate and the modulation scheme.

However, the present method requires a capacity given by:

Required backhaul capacity for soft data bits exchange=($Q·N$ data-bits/TTI)/(1 ms)=$Q·N$ kbps, where Q is the number of bits used for quantization of the soft bits at the decoder output. If Q=5 is used, then exchanging the soft data bits requires a backhaul capacity which is only 5 times larger than the capacity required for exchanging the decoded hard data bits.

Figure 9:
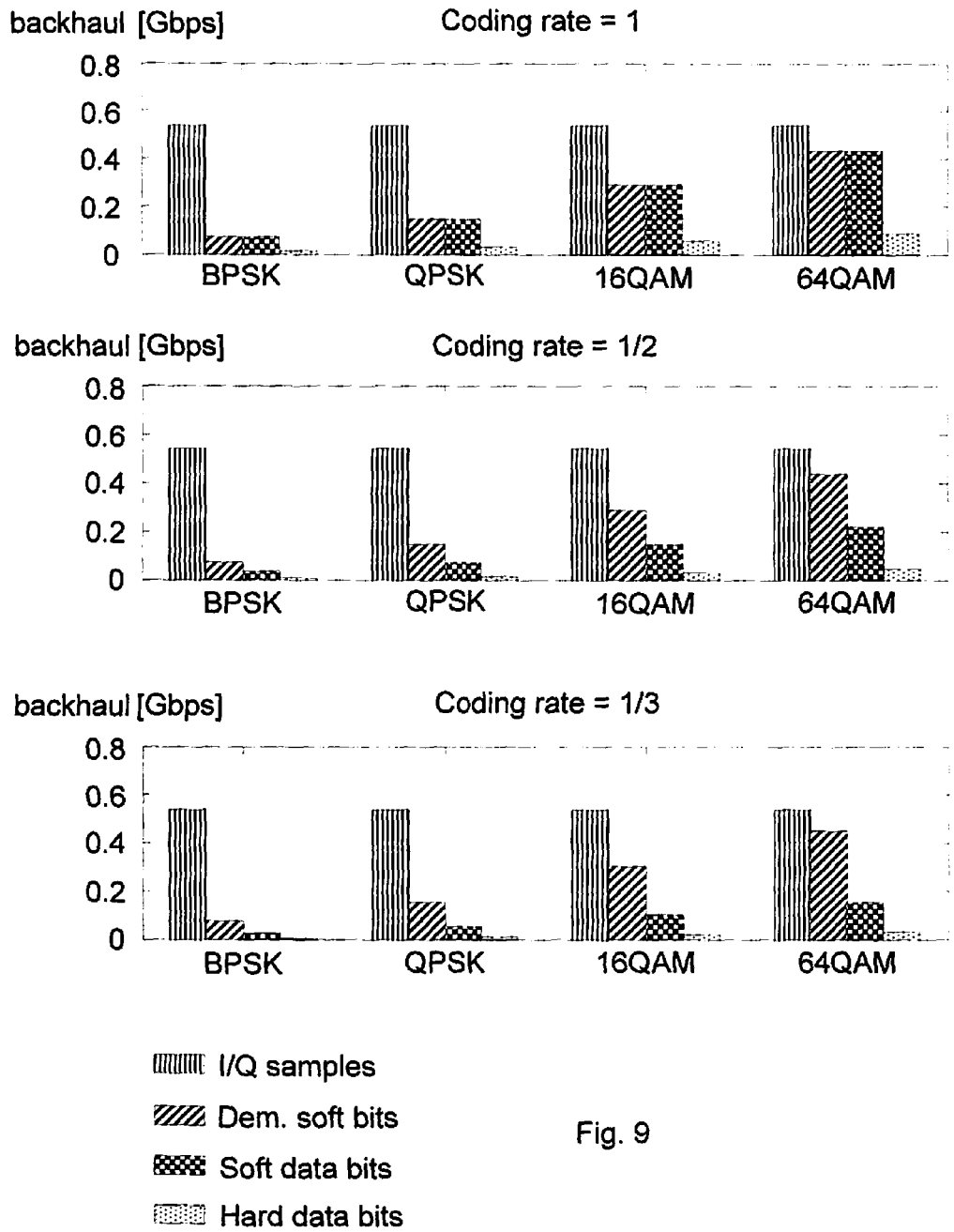
FIG. 9 is a schematic block diagram illustrating required backhaul capacity for different types of exchange information and various modulation and coding schemes.

FIG. 9 shows the required backhaul capacity of the four cases mentioned above for different modulation and coding schemes. It may be observed that exchanging the soft data bits according to the present method provides a good trade off in terms of the required backhaul capacity between exchanging the demodulated soft bits and exchanging the decoded hard bits in most cases. When very high rate codes are used, i.e. rate 1, there is only a negligible difference between the required capacity to exchange the demodulated soft bits and the decoded soft data bits according to the present method, due to the tail bits in the encoded block for terminating the encoder to the zero state. However, keeping in mind that the cooperation between base stations 110, 120 is intended to help out the user equipment 130 in need and in particular the cell edge user equipment units. These user equipment units 130 due to their poor signal strength may be advised not to use very high rate code and instead to take advantage of some error correction capability provided by encoding the data blocks at some lower rate code than rate one. Hence, the cases of interest shown in FIG. 9 are more likely when coding rate of ½ and ⅓ are used. In such cases it may be observed that exchanging the soft data bits according to the present method exhibits substantial gain in terms of the required backhaul capacity over exchanging the demodulated soft bits. This gain increases as the coding rate and the size of modulation signal constellation decreases.

When using the formulation "comprise" or "comprising" it is to be interpreted as non-limiting, i.e. meaning "consist at least of". The present invention is not limited to the above described preferred embodiments. Various alternatives, modifications and equivalents may be used. Therefore, the above embodiments are not to be taken as limiting the scope of the present invention, which is defined by the appending claims.

The invention claimed is:

1. A method in a serving base station comprising:
   receiving a signal transmitted from a user equipment for the serving base station, said signal conveying coded bits;
   demodulating the signal to obtain demodulated soft bits corresponding to the coded bits;
   decoding the demodulated soft bits to obtain first likelihood values for information data bits encoded by the coded bits;
   receiving second likelihood values for the information data bits from a supporting base station that also received and decoded the signal transmitted from the user equipment for the serving base station;
   determining binary values for the information data bits by making hard bit decisions on combined likelihood values obtained by combining the first and second likelihood values, or by selecting the first or the second likelihood values for use in making the hard bit decisions, in dependence on determining whether the serving base station or the supporting base station received the information data with the least distortion.

2. The method according to claim 1, wherein the method includes applying a receiver algorithm to the signal before said step of decoding, for one or more of interference mitigation, equalization, and channel estimation.

3. The method according to claim 1, further comprising sending a request to the supporting base station for the second likelihood values, so that said steps of receiving the second likelihood values and determining the binary values are performed in dependence on sending said request.

4. The method according to claim 3, further comprising deciding whether to send said request based on one or more of the following: radio traffic intensity, radio propagation conditions, backhaul capacity, used modulation scheme, used coding scheme, bit error rate, and a signal to noise ratio.

5. The method according to claim 1, further comprising performing error detection on the binary values, and sending a response to the user equipment for the information data bits, said response comprising an acknowledgment (ACK) if no error is detected, or a non-acknowledgment (NACK) if an error is detected.

6. The method according to claim 1, wherein said step of determining the binary values for the information data bits comprises selecting the first or the second likelihood values for use in making the hard bit decisions, in dependence on determining whether the serving base station or the supporting base station received the information data with the least distortion.

7. The method according to claim 1, wherein said step of determining the binary values for the information data bits comprises obtaining the combined values by calculating average likelihood values from the first and second likelihood values, and making the hard bit decisions on the average likelihood values.

8. The method according to claim 1, wherein the method includes receiving second likelihood values for the information data bits from more than one supporting base station, each supporting base station receiving and decoding the signal transmitted from the user equipment, and wherein said step of determining the binary values for the information data bits comprises determining the binary values by making hard bit decisions on combined likelihood values formed using any one or more of the second likelihood values from any one or more of the more than one supporting base station, or by selecting the first or any one of the second likelihood values from any of the more than one supporting base stations for use in making the hard bit decisions, in dependence on determining which base station among the serving and more than one supporting base stations received the information data with the least distortion.

9. The method according to claim 1, wherein said step of determining the binary values for the information data bits comprises performing a combining operation on the first and second likelihood values to obtain the combined likelihood values, and making the hard bit decisions on the combined likelihood values.

10. The method according to claim 1, wherein the first likelihood values are decoded soft data bits obtained from the signal as received and demodulated by the serving base station, wherein the second likelihood values are decoded soft data bits obtained from the signal as received and demodulated by the supporting base station, and wherein the binary values are the hard bit decisions representing the information data bits.

11. An arrangement in a serving base station, said arrangement comprising:
   a receiver configured to receive a signal transmitted from a user equipment for the serving base station, said signal conveying coded bits;
   a demodulator configured to demodulate the signal to obtain demodulated soft bits for the coded bits;

a decoder configured to decode the demodulated soft bits to obtain first likelihood values for information data bits encoded by the coded bits;

an intra base station connection interface configured to receive second likelihood values for the information data bits from a supporting base station that also received and decoded the signal transmitted from the user equipment for the serving base station; and a determining unit configured to determine binary values for the information data bits by making hard bit decisions on combined likelihood values obtained by combining the first and second likelihood values, or by selecting the first or the second likelihood values for use in making the hard bit decisions, in dependence on determining whether the serving base station or the supporting base station received the information data with the least distortion.

12. The arrangement according to claim 11, wherein the arrangement is configured to apply a receiver algorithm to the signal before said step of decoding, for one or more of interference mitigation, equalization, and channel estimation.

13. The arrangement according to claim 11, wherein the intra base station connection interface is configured to send a request for the second likelihood values to the supporting base station, so that the second likelihood values are received from the supporting base station and the binary values are determined, in dependence on sending said request.

14. The arrangement according to claim 13, further comprising a selecting unit configured to select whether to send said request based on one or more of the following: radio traffic intensity, radio propagation conditions, backhaul capacity, used modulation scheme, bit error rate, and signal to noise ratio.

15. The arrangement according to claim 11, further comprising an error detector configured to perform an error detection on the binary values, and a transmitter configured to transmit a response to the user equipment for the information data bits, which response comprises either an acknowledgment (ACK) if no error is detected, or a non-acknowledgment (NACK) if an error is detected.

16. The arrangement according to claim 11, further comprising a combining unit configured to obtain the combined likelihood values by combining the first and second likelihood values according to a combining operation, and wherein the determining unit is configured to determine the binary values from the combined likelihood values.

17. A method in a supporting base station that is configured to assist a serving base station in determining binary values of information data bits encoded in a signal transmitted by a user equipment for the serving base station, said method comprising:

receiving, at the supporting base station, the signal transmitted by the user equipment for the serving base station;

demodulating the signal to demodulated soft bits for coded bits conveyed in the signal;

decoding the demodulated soft bits to obtain likelihood values for the information data bits encoded by the coded bits; and reducing an amount of assistance data sent from the supporting base station to the serving base station by transmitting the likelihood values for the information data bits to the serving base station without also including the demodulated soft bits, to assist the serving base station in making hard bit decisions on the information data bits.

18. The method according to claim 17, further comprising, in advance of said step of decoding the signal, receiving a request from the serving base station for the likelihood values and, in response, applying a receiver algorithm to the signal before decoding, said receiver algorithm providing one or more of interference mitigation, equalization, and channel estimation.

19. An arrangement in a supporting base station that is configured to assist a serving base station in determining binary values of information data bits encoded in a signal transmitted from a user equipment for the serving base station, said arrangement comprising:

a receiver configured to receive the signal transmitted from the user equipment for the serving base station;

a demodulator configured to demodulate the signal to obtain demodulated soft bits for coded bits conveyed in the signal;

a decoder configured to decode the demodulated soft bits to obtain likelihood values for the information data bits encoded by the coded bits; and an intra base station connection interface configured to reduce the amount of assistance data sent from the supporting base station to the serving base station by transmitting the likelihood values for the information data bits to the serving base station without also including the demodulated soft bits, to assist the serving base station in making hard bit decisions on the information data bits.

* * * * *